(12) United States Patent
Yamada et al.

(10) Patent No.: US 9,001,222 B2
(45) Date of Patent: Apr. 7, 2015

(54) IMAGE PROCESSING DEVICE, IMAGE PROCESSING METHOD, AND PROGRAM FOR IMAGE PROCESSING FOR CORRECTING DISPLACEMENT BETWEEN PICTURES OBTAINED BY TEMPORALLY-CONTINUOUS CAPTURING

(75) Inventors: Hitoshi Yamada, Osaka (JP); Jun Ohmiya, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 331 days.

(21) Appl. No.: 13/521,133

(22) PCT Filed: Nov. 8, 2011

(86) PCT No.: PCT/JP2011/006230
§ 371 (c)(1),
(2), (4) Date: Jul. 9, 2012

(87) PCT Pub. No.: WO2012/063469
PCT Pub. Date: May 18, 2012

(65) Prior Publication Data
US 2012/0281146 A1  Nov. 8, 2012

(30) Foreign Application Priority Data
Nov. 11, 2010  (JP) .................................. 2010-253259

(51) Int. Cl.
*H04N 5/232* (2006.01)
*G06T 7/20* (2006.01)

(52) U.S. Cl.
CPC ....... *H04N 5/23254* (2013.01); *H04N 5/23248* (2013.01); *H04N 5/23267* (2013.01); *G06T 7/2033* (2013.01); *G06T 2207/10016* (2013.01); *G06T 2207/20164* (2013.01)

(58) Field of Classification Search
CPC .......... H04N 5/23248; H04N 5/23254; H04N 5/23258; H04N 5/23267
USPC ...................... 348/208.1, 208.3, 208.4, 208.6
See application file for complete search history.

(56) References Cited

U.S. PATENT DOCUMENTS

| 7,092,019 B1 | 8/2006 | Ogata et al. |
| 7,502,052 B2 * | 3/2009 | Kamoshida .............. 348/208.99 |

(Continued)

FOREIGN PATENT DOCUMENTS

| EP | 1 577 836 | 9/2005 |
| EP | 1 978 731 | 10/2008 |

(Continued)

OTHER PUBLICATIONS

European Search Report issued Mar. 7, 2014 in European Patent Application No. 11840319.5 which is a foreign counterpart to the present application.

(Continued)

*Primary Examiner* — Nicholas Giles
(74) *Attorney, Agent, or Firm* — Wenderoth, Lind & Ponack, L.L.P.

(57) ABSTRACT

An image processing device of the present invention includes: a motion amount estimating unit which estimates, using feature points extracted from each of a first picture and a second picture, a motion amount indicating an amount of displacement of the second picture with respect to the first picture, the second picture being captured temporally after the first picture; a determining unit which determines, using the feature points, whether or not correction is made using the motion amount estimated by the motion amount estimating unit; and a picture correcting unit which corrects the displacement of the second picture with respect to the first picture using the motion amount so as to correct the displacement between the pictures, in the case where the determining unit determines that the correction is made using the motion amount.

11 Claims, 18 Drawing Sheets

(56) References Cited

U.S. PATENT DOCUMENTS

| | | | |
|---|---|---|---|
| 7,929,043 B2* | 4/2011 | Tsubaki et al. | 348/348 |
| 8,294,773 B2* | 10/2012 | Oshino et al. | 348/208.6 |
| 8,508,651 B2* | 8/2013 | Tsubaki et al. | 348/348 |
| 2005/0206739 A1* | 9/2005 | Kamoshida | 348/208.99 |
| 2006/0017813 A1* | 1/2006 | Okubo et al. | 348/208.2 |
| 2008/0231715 A1 | 9/2008 | Endo | |
| 2008/0246848 A1* | 10/2008 | Tsubaki et al. | 348/208.4 |
| 2009/0128700 A1* | 5/2009 | Oshino et al. | 348/580 |
| 2010/0079605 A1* | 4/2010 | Wang et al. | 348/208.4 |
| 2010/0231731 A1* | 9/2010 | Motomura et al. | 348/208.4 |
| 2011/0211081 A1* | 9/2011 | Tsubaki et al. | 348/208.1 |
| 2013/0010139 A1* | 1/2013 | Oshino et al. | 348/208.4 |

FOREIGN PATENT DOCUMENTS

| | | |
|---|---|---|
| JP | 2000-341582 | 12/2000 |
| JP | 2006-295626 | 10/2006 |
| JP | 2007-129587 | 5/2007 |
| JP | 2008-219124 | 9/2008 |
| JP | 2008-236645 | 10/2008 |
| JP | 2009-021929 | 1/2009 |
| JP | 2009-171341 | 7/2009 |

OTHER PUBLICATIONS

International Search Report issued Dec. 13, 2011 in International (PCT) Application No. PCT/JP2011/006230.

* cited by examiner

Picture t-1

Picture t

Picture t-1

Picture t

○ Feature point

Picture t-1

Picture t-1

○ Feature point found in common between pictures (inlier)
△ Feature point whose position shifted between pictures
✗ Feature point not in common between pictures ○ Feature point found in common between pictures (inlier)
△ Feature point whose position shifted between pictures
✕ Feature point not in common between pictures Before shake amount estimation
(a)

After shake amount estimation
(b)

Picture t

Picture t-1

IMAGE PROCESSING DEVICE, IMAGE PROCESSING METHOD, AND PROGRAM FOR IMAGE PROCESSING FOR CORRECTING DISPLACEMENT BETWEEN PICTURES OBTAINED BY TEMPORALLY-CONTINUOUS CAPTURING

TECHNICAL FIELD

The present invention relates to a technique to correct an image captured with a digital still camera, a camcorder, and a wearable camera.

BACKGROUND ART

Image processing can be used as a technique to correct shake (displacement between pictures) on an image captured by an ultra-wide optical system, such as a fisheye optical system. Based on the information on an object captured in common between two pictures obtained by temporally-continuous capturing, the technique detects a motion vector used in an MPEG technique, and estimates camera shake between frames (pictures) in order to correct the shake. The technique to use the motion vector inevitably faces limitations in terms of accuracy and calculation cost, since an algorithm of the technique characteristically detects the motion vector in an area of the pictures. Such limitations require the motion-vector-based technique to previously set an upper limit of the magnitude of the camera shake. Thus, the technique cannot detect such great shake as one included in, for example, an image captured while walking and an image captured with a finder-less camera. In other words, some camera shake is too great to be corrected by the motion-vector-based technique.

In contrast, a feature-point-based matching technique is capable of correcting the shake which the motion-vector-based technique cannot correct. The matching technique uses some of the feature points on an object found in common between two pictures obtained by temporally-continuous capturing.

Specifically described here is a matching technique using feature points (also referred to as feature point matching).

FIGS. 1A to 1D illustrate a matching technique using feature points. Hereinafter, of the two pictures, the picture captured earlier is referred to as Picture t−1, and the picture captured later is referred to as Picture t.

FIG. 1A illustrates Picture t−1 and Picture t which is captured after Picture t−1. FIG. 1B shows feature points extracted from Picture t−1 and Picture t illustrated in FIG. 1A. FIG. 1C shows characteristic types of the feature points extracted from Picture t−1 and Picture t in FIG. 1B. FIG. 1D shows matching of the feature points extracted from Picture t−1 and Picture t in FIG. 1B. Here, the feature points are characteristic points to be detected by image processing and found on the picture.

Pixels having greater contrast on Picture t−1 and Picture t in FIG. 1A are selected as the feature points in FIG. 1B. As FIG. 1B shows, some feature points, found on corners and having significantly great contrast, are easily extracted in common from both of the pictures (Picture t−1 and Picture t). Meanwhile, some feature points whose contrast is not so great are not easily extracted from both of the pictures (Picture t−1 and Picture t).

The feature points in FIG. 1B include (i) feature points (feature points indicated in O in FIG. 1C) obtained from a common area of view between the pictures (Picture t−1 and Picture t) and (ii) feature points (feature points indicated in Δ in FIG. 1C) obtained from the common area of view between the pictures (Picture t−1 and Picture t) but their positions have shifted between the pictures (Picture t−1 and Picture t). Moreover, some of the feature points in FIG. 1B (feature points indicated in x in FIG. 1C) are obtained from areas not in common between the pictures (Picture t−1 and Picture t). Feature points to be matched among the feature points in FIG. 1B are the ones (feature points indicated in O in FIG. 1C) obtained from the common area of view between the pictures (Picture t−1 and Picture t).

Before the matching, however, it is impossible to find the positions and the ratios of the feature points obtained from the common area of view between the pictures (Picture t−1 and Picture t). Hence, it is also impossible to find which feature points are obtained from the common area of view between the pictures (Picture t−1 and Picture t). Thus, a technique such as the Random Sample Consensus (RANSAC) is used to select pairs of feature points from the feature points extracted from Picture t−1 and the feature points extracted from Picture t, and calculate an evaluation value of each pair of feature points based on a preset evaluation function (FIG. 1D). The evaluation value is designed to be likely to increase when the obtained pair (hereinafter referred to as inlier) of feature points is from the common area of view between the pictures (Picture t−1 and Picture t).

Specifically, a rotation matrix is calculated from a combination of two pairs of feature points selected among the feature points extracted from Picture t−1 and the feature points extracted from Picture t. In order to recalculate to find out whether or not the calculated rotation matrix is correct, the calculated rotation matrix rotates feature points included in Picture t−1 and representing other than the feature points of the selected pairs. Then, the rotated feature points in Picture t−1 are checked whether or not the rotated feature points match the feature points in Picture t. In the case where the rotated feature points in Picture t−1 match the feature points in Picture t, the calculated rotation matrix is likely to represent a correct shake amount (degree of displacement) between the pictures. Hence, based on a degree of the matching, an evaluation function is set as the evaluation value. Searches are conducted for predetermined times based on the evaluation function. Once the searches are conducted for the predetermined times, the searches are terminated, and a rotation matrix is estimated based on the inlier having the largest evaluation value at the moment of the termination. It is noted that the inlier is a feature point found in common between pictures, such as the feature points indicated in O in FIG. 1C. Such feature points are obtained mainly from a distant view area in a captured picture. Then, the shake in the pictures is corrected, using the rotation matrix estimated based on the inlier; that is, feature points in a distant view.

That is how typical matching is conducted using the feature points. In other words, the feature point matching involves the operations below. First, displacement; namely shake, developed between pictures (Picture t−1 and Picture t) is repetitively searched so that the distribution of feature points in Picture t−1 and the distribution of feature points in Picture t match each other as much as possible. Here, the matching feature points in Picture t−1 and Picture t are found in a common area between the Picture t−1 and Picture t. Then, a shake amount between the pictures (Picture t−1 and Picture t) is estimated as the motion amount that is calculated when the distributions of the feature points obtained in the common area between Picture t−1 and Picture t match with each other at the greatest degree. The feature point matching is carried out to continuously estimate the shake amount developed between the pictures (between the frames) for each picture in order to correct the shake on an image (every picture) based on the estimated shake amount.

Moreover, as characteristics of a typical algorithm, the feature point matching is based on the similarity between pictures (frames) in feature point distribution. Thus, the feature point matching has an advantage over the motion-vector-based technique carried out using partial area information of a picture, since the feature point matching is low in calculation cost. Furthermore, the feature point matching is capable of matching, using feature points throughout a picture. Consequently, the matching technique can estimate a rather great amount of shake. Hence, the use of the feature point matching as makes it possible to estimate a great shake included in an image captured while walking and an image captured with a finder-less camera. In other words, the feature point matching can correct camera shake which is too great to be corrected by the motion-vector-based technique.

It is noted that when shake to be corrected is in an image captured by, for example, a fisheye optical system, a traveling route of incident light from outside into the lens alters, depending on the projection technique adopted to the fisheye optical system. Such an alteration requires transformation of coordinates, depending on the projection technique adopted to the fisheye optical system. This is because when a shake amount of the camera between pictures (frames) is estimated in image processing, it is necessary to know how the camera has moved with respect to the world coordinate. In other words, in order to obtain a correct camera shake amount, it is necessary to know that each pixel is obtained from which position in the world coordinate. Thus, either the motion-vector-based technique or the feature point matching is used for estimating a shake amount, the coordinate transformation should be taken into consideration before the estimation.

For example, Patent Literature 1 discloses a technique to estimate a shake amount of an image captured by a fisheye optical system, based on a motion vector for image processing.

CITATION LIST

Patent Literature

[PTL 1]
Japanese Unexamined Patent Application Publication No. 2006-295626

SUMMARY OF INVENTION

Technical Problem

When the shake amount is estimated, not only by the feature point matching but also by image processing in general, the image processing would inevitably correct such an image as one whose shake amount cannot be estimated. Consequently, quality of the corrected image deteriorates.

Described hereinafter is how the ability to estimate a shake amount from a picture depends on an object in the picture (object dependency issue).

FIG. 2A exemplifies the case where blur develops in a picture. FIG. 2B exemplifies the case where no distinction is found in a picture. FIG. 2C exemplifies the case where a picture include a periodical pattern.

For example, when the picture includes blur as shown in FIG. 2A, the blur inevitably rounds the values of pixels to be directly used for feature point matching or a motion vector. Thus, estimation accuracy is low when the shake amount is estimated by such image processing. In some cases, even the estimation of the shake amount itself is impossible. When no distinctive object is captured in a picture as shown in FIG. 2B, there are few features of the picture which are taken advantage of for the image processing, such as the feature point matching and the motion-vector-based technique. Hence, similar to the case in FIG. 2A, estimation accuracy is low when the shake amount is estimated by such image processing techniques. In some cases, even the estimation of the shake amount itself is impossible. Moreover, when the picture includes a periodical pattern (texture), such as tiles on pavement in FIG. 2C, the images in the picture have similar features. Thus, there are multiple features of the picture which are taken advantage of for image processing, such as the feature point matching and the motion-vector-based technique; however, the multiple features themselves are similar to one another. Consequently, it is difficult to uniquely determine a value of the shake amount estimated by the image processing, and a correct shake amount cannot be estimated.

The problems exemplified in FIGS. 2A to 2C cannot be prevented as far as the shake amount is estimated by processing based on picture information; that is, by image processing. It is noted that the estimation technique disclosed in Patent Reference 1 fails to take into consideration the pictures in FIGS. 2A to 2C.

Moreover, when the motion-vector-based technique is used for scenes including the pictures in FIGS. 2A to 2C, a decrease in estimation accuracy is not the only problem. In some cases, image in quality of the pictures could even deteriorate compare to the case where no correction is made on the pictures.

The present invention is conceived in view of the above problems and has as an object to provide an image processing device, an image processing method, and a program for the image processing method which are capable of correcting in high accuracy a shake amount between pictures obtained by temporally-continuous capturing even though a shake amount of the pictures cannot be estimated by image processing.

Solution to Problem

In order to achieve the above object, an image processing device according to an aspect of the present invention corrects displacement between pictures obtained by temporally-continuous capturing. The image processing device includes: a motion amount estimating unit configured to estimate, using feature points extracted from each of a first picture and a second picture, a motion amount indicating an amount of displacement of the second picture with respect to the first picture, the second picture being captured temporally after the first picture; a determining unit configured to determine, using the feature points, whether or not correction is made using the motion amount estimated by the motion amount estimating unit; and a picture correcting unit configured to correct the displacement of the second picture with respect to the first picture using the motion amount so as to correct the displacement between the pictures, in the case where the determining unit determines that the correction is made using the motion amount.

This structure makes it possible to determine, using the feature points, whether or not a picture is unsuitable to image processing using picture information to be obtained through feature-point-based matching processing. Thus, the image processing device and the image processing method which achieve the above feature are capable of correcting in high accuracy a shake amount between pictures obtained by temporally-continued capturing, even though some of the pictures cannot have the shake amounts estimated by image processing.

It is noted that, instead of being implemented as such a device, the present invention may be implemented as an integrated circuit including the processing units included in the device, a method including the processing units included in the device as steps, a program to cause a computer to execute such steps, and information, data, and signals showing the program. Such a program, information, data, and signals may be distributed via a recording medium such as a CD-ROM and a communications medium such as the Internet.

Advantageous Effects of Invention

The present invention can implement an image processing device, an image processing method, and a program which successfully correct in high accuracy a shake amount between pictures obtained by temporally-continued capturing, even though some of the pictures cannot have the shake amounts estimated by image processing.

DESCRIPTION OF EMBODIMENTS

Described hereinafter are the embodiments of the present invention, with reference to the drawings.

Embodiment 1

Figure 3:
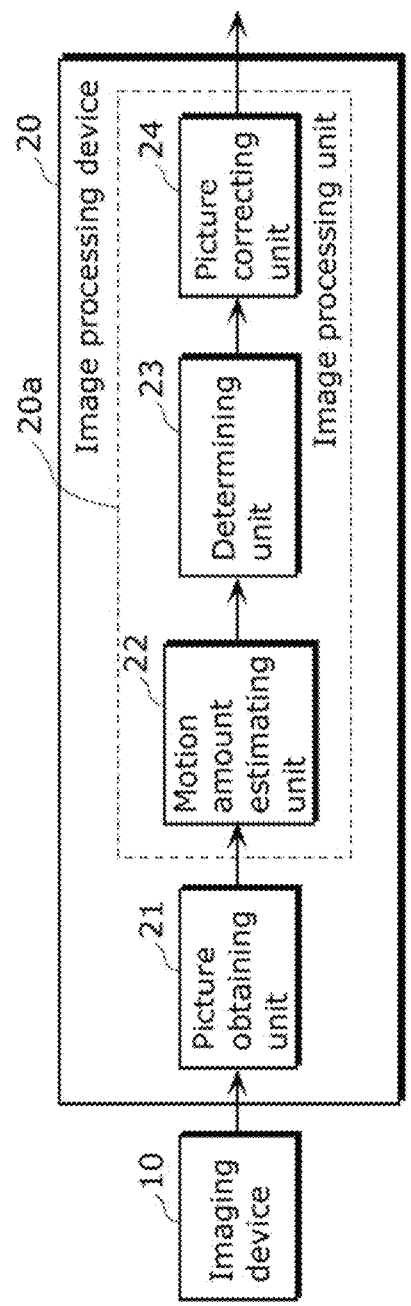
FIG. 3 depicts a block diagram showing an overall structure of an image processing device according to Embodiment 1 of the present invention.

FIG. 3 depicts a block diagram showing an overall structure of an image processing device according to Embodiment 1 of the present invention.

An imaging device 10 is, for example, a camera such as a digital still camera and a digital camcorder. The imaging device 10 includes imaging devices such as a charge-coupled device (CCD) sensor and a complementary metal-oxide semiconductor (CMOS) sensor, and captures an image and provides the image in the form of electric signals.

An image processing device 20 corrects displacement between pictures obtained by temporally-continuous capturing. The image processing device 20 includes an image processing unit 20a and a picture obtaining unit 21.

The picture obtaining unit 21 obtains picture data to be processed. Specifically, among the pictures obtained by temporally-continuous capturing with the imaging device 10, the picture obtaining unit 21 obtains picture data for two of the pictures. The two pictures are a first picture (Picture t−1) and a second picture (Picture t) captured temporally after the first picture (Picture t−1).

Here, Picture t−1 and Picture t exemplify the first picture and the second picture, respectively. For the sake of simplification, time-wise, Picture t−1 (first picture) is assumed to be captured immediately before Picture t (second picture), and Picture t is assumed to be captured immediately after Picture t−1. The image data for Picture t−1 and Picture t may be compression-coded by a typical JPEG technique and may be recorded in the form of a video such as MPEG-4.

The image processing unit 20a includes a motion amount estimating unit 22, a determining unit 23, and a picture correcting unit 24, and processes picture data obtained from the picture obtaining unit 21.

Figure 4:
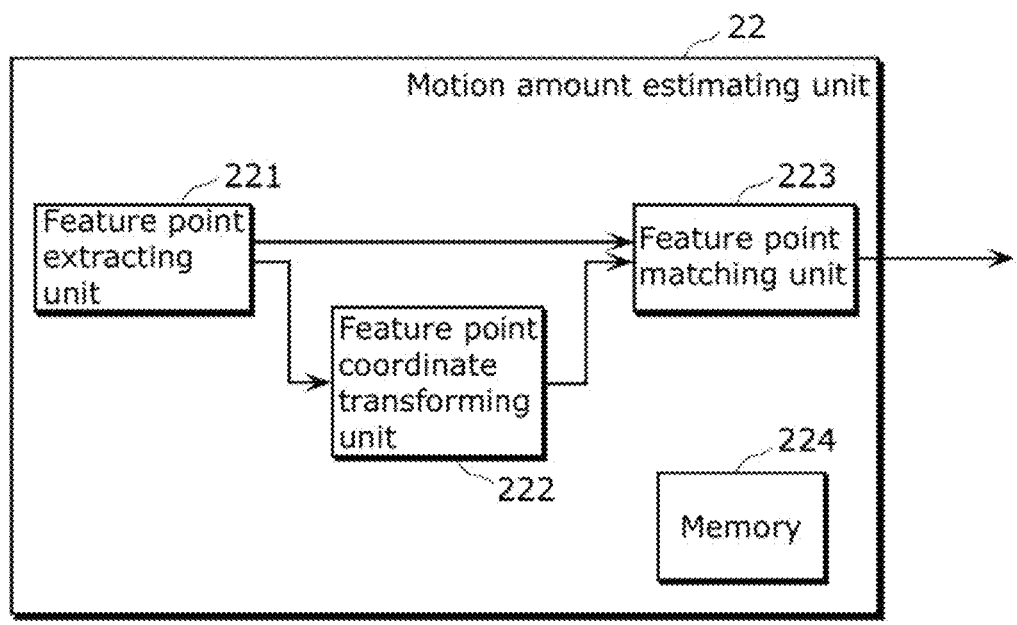
FIG. 4 depicts a block diagram showing a structure of a motion amount estimating unit according to Embodiment 1 of the present invention.

As shown in FIG. 4, the motion amount estimating unit 22 includes a feature point extracting unit 221, a feature point coordinate transforming unit 222, a feature point matching unit 223, and a memory 224. Using feature points extracted from each of the first picture and the second picture, the motion amount estimating unit 22 estimates a motion amount indicating a displacement amount of the second picture with respect to the first picture. Here, the second picture is captured temporally after the first picture. FIG. 4 depicts a block diagram showing a structure of the motion amount estimating unit 22 according to Embodiment 1 of the present invention.

The feature point extracting unit 221 extracts first feature points from the first picture and second feature points from the second picture. Specifically, the feature point extracting unit 221 receives Picture t−1 and Picture t obtained by the picture obtaining unit 21, extracts the feature points from the obtained Picture t−1 and Picture t, and generates feature point data t−1 and feature point data t.

Here, the feature points show features found on a picture and detectable by the image processing. The feature points include a point where a vertical sharp edge and a horizontal sharp edge in a picture intersect with each other, and a point where two strong edges each extending in a different direction are found near a local. A desirable feature point (inlier) is to be stably detected (estimated) among points found in common between the two pictures; namely, temporally continuous Picture t−1 and Picture t. When the feature point extracting unit 221 extracts feature points, however, an accurate positional relationship between Picture t−1 and Picture t is unknown. Hence, some kind of criteria are essential in order to extract common feature points.

Described hereinafter is a criterion used for extracting the common feature points.

When Harris is used for extracting feature points, for example, extracted are corner points where vertical and horizontal edges intersect with each other with respect to an edge of a picture.

Specifically, the feature point extracting unit 221 extracts the corner points by calculating a feature point score, which represents an intersection of the edges, for each pixel. In theory, a feature point score is calculated by feature point extracting unit 221 for each of the pixels. However, when the image processing device 20 is in an environment having a resource limit such as an embedded system, there can be an upper limit to the number of feature points to be used for matching by the feature point matching unit 223 in the later stage. Taking the upper limit into consideration, it is not desirable for the feature point matching unit 223 to use all the feature points calculated by the feature point extracting unit 221 to perform matching processing, in terms of a calculation cost and calculation accuracy. Hence, desirable matching processing is performed based on a specific number of feature points determined in descending order of feature point scores.

Described hereinafter is the reason why it is desirable to adopt a specific number of feature points determined in descending order of feature point scores. An edge used in Harris reflects a variation in contrast (luminance value) of a picture. Thus; when a variation in a lighting condition is small, the contrast in the picture is held and the edge does not disappear. In other words, the edge is less likely to disappear between pictures (between picture frames) unless the edge is covered by an obstacle and thus the edge itself disappears. Consequently, a point having a higher feature point score based on edge information is likely to be found as a feature point in common between Picture t−1 and Picture t.

Hence, in using a feature point score as an criterion for extracting the common feature point, the feature point extracting unit 221 extracts a feature point having a higher score than a specific threshold value. Here, when the feature point score is used to extract a feature point, the specific threshold value may be a value at an average score in a picture or a value determined based on a temporal average score among multiple pictures. Moreover, the specific threshold value does not have to be the only threshold value in the entire picture; instead, a threshold value may be generated for each area. Furthermore, the threshold value to be generated for each area may be determined based on a single picture or may be determined among multiple pictures arranged in a time order.

In addition, the feature point score may be determined based on a score of an object under some sort of object recognition.

It is noted that typical techniques other than the above one for the feature point extracting unit 221 include Scale-Invariant Feature Transform (SIFT) and Speeded Up Robust Features (SURF).

The feature point coordinate transforming unit 222 transforms coordinates of the first feature points of the first picture and coordinates of the second feature points of the second picture into coordinates which conform to the projection technique of a fisheye optical system. Here, the first and second feature points are extracted by the feature point extracting unit 221. Specifically, when a fisheye optical system is used to capture pictures obtained by temporally-continuous capturing, the feature point coordinate transforming unit 222 transforms coordinates of feature points in the captured pictures into coordinates of feature points which conform to the projection technique adopted for the fisheye lens.

It is noted that the reason for the coordinate transformation is that the coordinates of the feature points differ in positions between feature point coordinates in the world coordinate and feature point coordinates obtained from an input picture by the projection technique adopted for an ultra-wide fisheye-optical system. Thus, in order to estimate a correct camera shake amount from a picture, it is necessary to match the positions of feature point coordinates in the world coordinate and the positions of feature point coordinates obtained from an input picture. Here, the feature point coordinate transforming unit 222 performs inverse transformation of the projective transformation on the feature point coordinates obtained from the input picture. It is noted that the coordinate transformation is performed on coordinates of an inlier of feature points in a long distance view, and the inlier is obtained by the feature point matching unit 223. The coordinate transformation may be performed not only on the coordinates of such an inlier of feature points in a long distance view; instead, the coordinate transformation may be performed on the coordinates throughout a picture.

It is noted that the feature point coordinate transforming unit 222 does not execute processing in the case where a wide optical system, such as a fisheye optical system, is not used for capturing multiple pictures obtained by temporally-continued capturing. In such a case, the motion amount estimating unit 22 causes the feature point extracting unit 221 to directly provide, to the feature point matching unit 223, the first feature points in the first picture and the second feature points in the second picture.

The feature point matching unit 223 matches the second feature points of the second picture and the first feature points of the first picture with each other to estimate a motion amount indicating a displacement amount of the second picture with respect to the first picture. In the case where a fisheye optical system is used for capturing multiple pictures obtained by temporally-continued capturing, the feature point matching unit 223 matches between the second feature points and the first feature points to estimate a displacement amount indicating a displacement amount of the second picture with respect to the first picture. Here the coordinates of the first and second feature points are transformed by the feature point coordinate transforming unit 222.

Specifically, the feature point matching unit 223 matches between the feature point data t of Picture t and the feature point data t−1 of Picture t−1; that is, the feature point matching unit 223 estimates a corresponding relationship between the feature point data t−1 and t. Here, the feature point data t−1 is extracted by the feature point extracting unit 221 from Picture t−1 in the previous frame period, and stored in, for example, the memory 224. The feature point data t is extracted by the feature point extracting unit 221 from Picture t in the current frame period.

Based on the feature point data t−1 and the feature point data t, the feature point matching unit 223 estimates a rotation matrix indicating a camera motion occurring between Picture t−1 and Picture t. Here, the rotation matrix is calculated by a technique such as RANdom Sample Consensus (RANSAC). Derived from the rotation matrix are the rotational components of roll, pitch, yaw representing an amount of camera shake developed between the frames; namely, between the pictures. It is noted that in the case where the rotation matrix is misestimated, a 0 is set to roll, pitch, yaw. Thus, no rotation is assumed between the pictures.

That is how the motion amount estimating unit 22 is structured.

Figure 5:
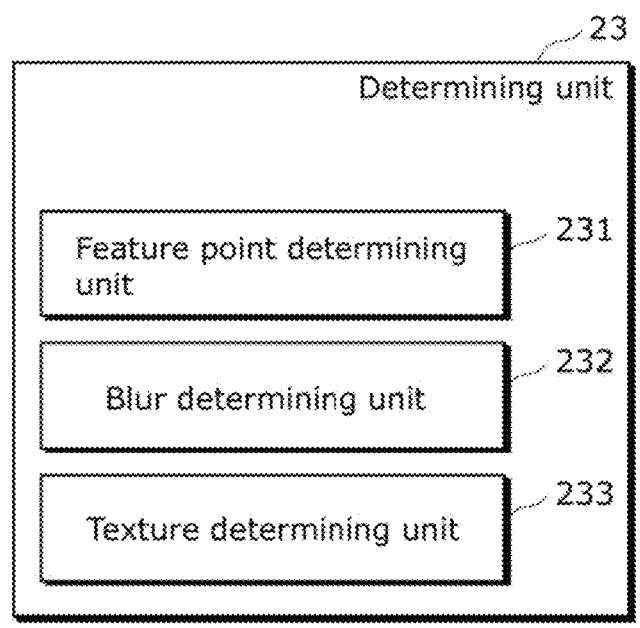
FIG. 5 depicts a block diagram showing a structure of a determining unit 23 according to Embodiment 1 of the present invention.

As shown in FIG. 5, the determining unit 23 includes a feature point determining unit 231, a blur determining unit 232, and a texture determining unit 233. Using the extracted feature points, the determining unit 23 determines whether or not to correction is made using the motion amount estimated by the motion amount estimating unit 22. FIG. 5 depicts a block diagram showing a structure of the determining unit 23 according to Embodiment 1 of the present invention.

In the case where the determining unit 23 determines, based on the extracted feature points, that the motion amount estimated by the motion amount estimating unit 22 indicates the displacement amount (shake amount) of the second picture with respect to the first picture, the determining unit 23 determines that correction is made using the motion amount estimated by the motion amount estimating unit 22. Specifically, based on information obtained from the pictures, the determining unit 23 determines a scene which is unsuitable to image processing; that is, a scene including a picture whose shake amount of the camera cannot be estimated by image processing. In the case where the determination result shows that the scene includes the picture whose shake amount of the camera cannot be estimated by the image processing, the determining unit 23 causes the picture correcting unit 24 to avoid image processing.

Figure 2A:
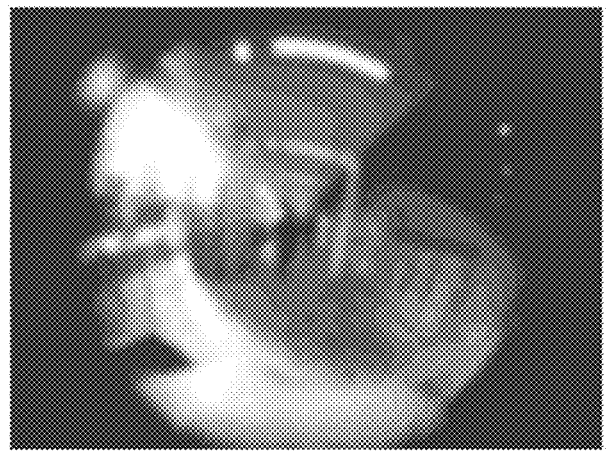
FIG. 2A exemplifies the case where blur develops in a picture.
Figure 2B:
FIG. 2B exemplifies the case where no distinction is found in a picture.

As examples, the scene includes the following pictures whose camera shake amount cannot be estimated by the image processing: The picture includes blur as shown in FIG. 2A, no distinctive object is captured in the picture as shown in FIG. 2B, and the picture includes a periodical pattern (texture), such as tiles on pavement in FIG. 2C. Described hereinafter is how the determining unit 23 determines the above cases.

Figure 6:
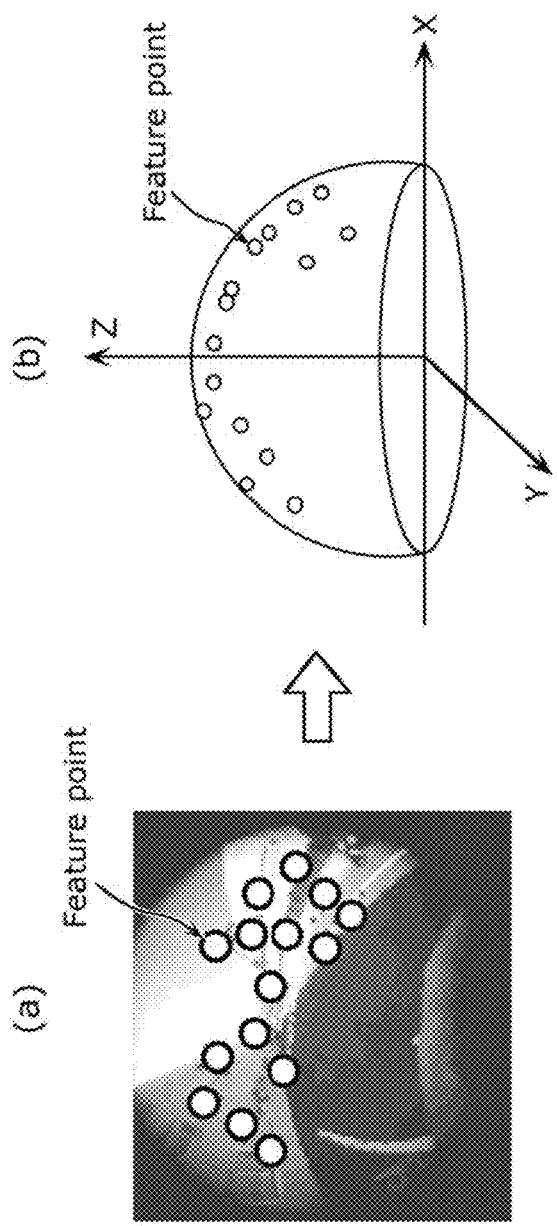
FIG. 6 shows the case where a two-dimensional picture, captured by an optical system having a wide angle of view, is projected into the three dimensions.
Figure 7:
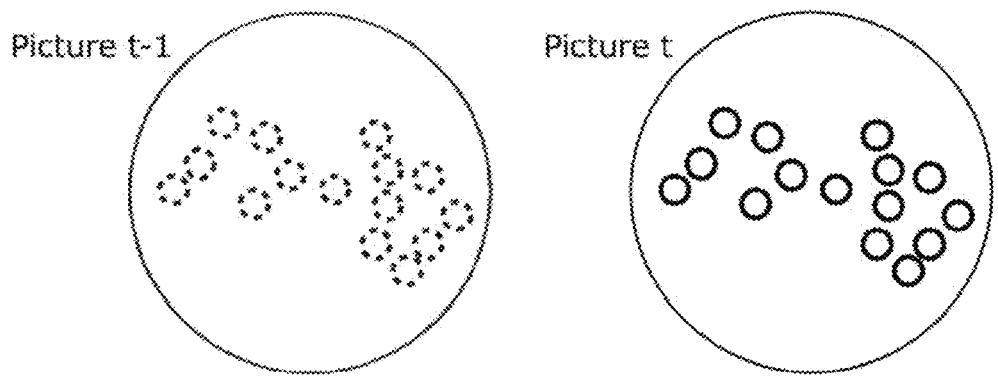
FIG. 7 exemplifies feature points in Picture t−1 and Picture t projected into three dimensions.
Figure 8:
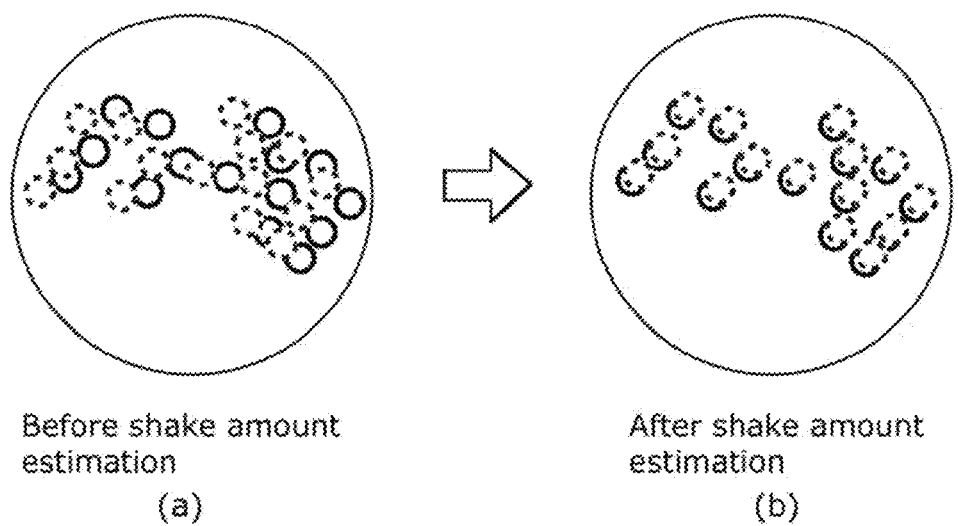
FIG. 8 shows the case where feature points, found in Picture t−1 and Picture t projected into three dimensions, are matched with one another when no blur develops.
Figure 9:
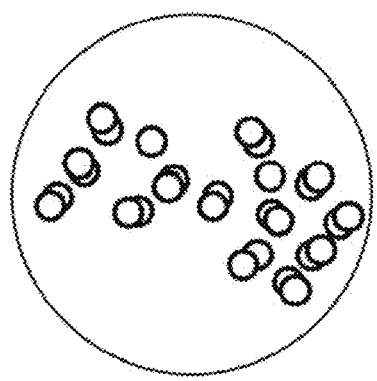
FIG. 9 exemplifies displacement of feature points projected into three dimensions in both of the cases where blur develops and no blur develops.
Figure 10:
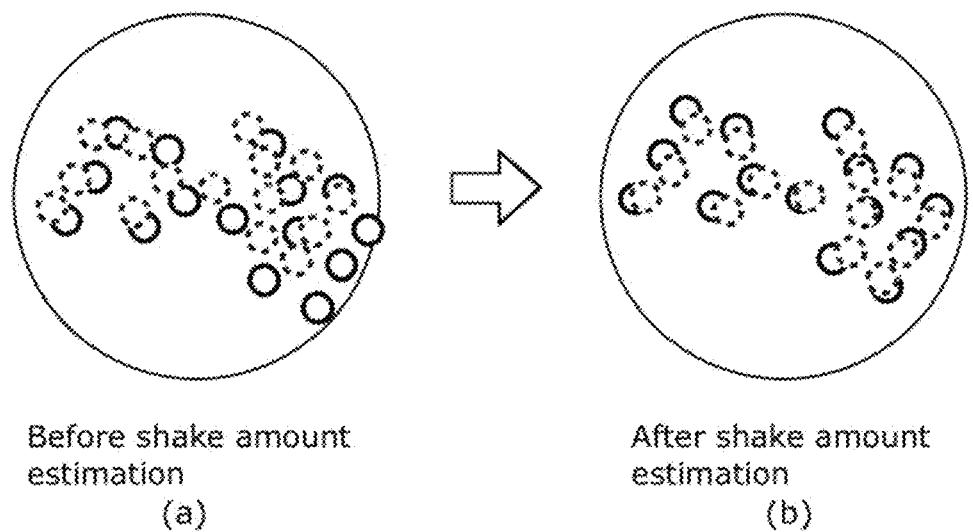
FIG. 10 shows the case where the feature points, found in Picture t−1 and Picture t projected into three dimensions, are matched with one another when blur develops.

Described first is how to determine a picture including blur therein as shown in FIG. 2A. FIG. 6 shows the case where a two-dimensional picture, captured by an optical system having a wide angle of view, is projected into three dimensions. FIG. 7 exemplifies feature points in Picture t−1 and Picture t projected into three dimensions. FIG. 8 shows the case where feature points, found in Picture t−1 and Picture t projected into three dimensions, are matched with one another when no blur develops. FIG. 9 exemplifies displacement of feature points projected into three dimensions in both of the cases where blur develops and no blur develops. FIG. 10 shows the case where the feature points, found in Picture t−1 and Picture t projected into three dimensions, are matched with one another when blur develops.

The blur determining unit 232 determines a picture including blur, using the feature point matching. Described below is how to determine such a picture.

When or after a rotational motion (roll, pitch, yaw); namely three-dimension information, is obtained from a two-dimensional (x,y) picture, the feature points of the picture are projected into three dimensions. Based on the three-dimensionally projected feature points, a relationship of the distribution of the feature points can be checked. Specifically, first, a two-dimensional picture, whose feature points are extracted, is projected into the three-dimensions as shown in FIG. 6. Here, (a) in FIG. 6 is a typical example showing that the picture is captured by a fisheye optical system and has the feature points extracted. The picture (b) in FIG. 6 shows the distribution of the feature points projected to coordinates in three dimensions. The coordinates are transformed because, as described above, the rotational motion (roll, pitch, yaw); that is three-dimension information which cannot be obtained on a two-dimensional (x,y) picture plane, needs to be obtained. Moreover, when the coordinates of the feature points differ in positions between feature point coordinates in the world coordinate and feature point coordinates obtained from an input picture by the projection technique adopted for a fisheye-optical system, the coordinate transformation is required to carry out correction, taking into consideration the displacement caused by the projection technique. In other words, the coordinate transformation is carried out to estimate, from the picture, a rotational movement of a correct camera shake amount. In addition, projective transformation is carried out here in order to match the positions of the feature point coordinates obtained from the input picture and the positions of the feature point coordinates in the world coordinate. Such coordinate transformation is effective in correcting optical strain not only for the fisheye optical system, but also for optical systems (lens). Then, the feature points are projected into three dimensions based on the obtained rotational movement. The three-dimensionally projected feature points show the distribution relationship of the feature points.

Using such a technique, the blur determining unit 232 projects the feature points into three dimensions, and checks the distribution relationship of the feature points between the pictures (frames) based on the camera shake amount developed between the pictures (frames) and estimated by the motion amount estimating unit 22.

In the case where no blur is included in pictures to be shake-corrected, the picture contrast is maintained between the as pictures (frames). Thus, as shown in FIG. 7, the intra-picture (intra-frame) distribution of the feature points is similar between the Picture t−1 and the Picture t. In the case where a correct shake amount (motion amount) is estimated by the motion amount estimating unit 22, the feature point distributions between Picture t−1 and Picture t approximately match with each other as (a) becomes (b) in FIG. 8. In the case where blur is included in the pictures to be shake-corrected, the picture contrast is not maintained between the between pictures (frames). Thus, the contrast in Picture t decreases because of the blur. Consequently, the obtained feature point distribution differs from that without blur. Specifically, as shown in FIG. 9, the similarity of the obtained feature point distribution is low between the pictures (frames). When the feature point distribution having the low similarity is used to estimate a camera shake amount (motion amount) between the pictures (frames), a correct shake amount cannot be estimated as (a) becomes (b) in FIG. 10. In other words, the matching degree of feature point distributions decreases between Picture t−1 and Picture t.

Utilizing such characteristics, the blur determining unit 232 can approximately determine, based on the matching degree of the distributions of the feature points, whether or not blur has developed between the pictures (frames).

As described above, the blur determining unit 232 approximately determines whether or not blur has developed in a picture. Specifically, the blur determining unit 232 may, for example, count the number of feature points whose matching degrees are within a certain distance, and determine that blur is found in the case where the number of the feature points is smaller than a threshold value. Furthermore, the blur determining unit 232 may measure a matching degree for each of the feature points, and determine that blur is found in the case where the sum of the matching degrees is higher than a threshold value. Moreover, the blur determining unit 232 may measure a moving direction of each of the feature points, and determines whether or not blur is found based on the variation in the moving directions.

As described above, the blur determining unit 232 (i) projects, as coordinates in three dimensions, the coordinates of the first feature points extracted from the first picture and of the second feature points extracted from the second picture (ii) determines whether or not a matching degree, between a feature point distribution of the first feature points in the three dimensions and a feature point distribution of the second feature points in the three dimensions, is higher than a predetermined matching degree, and in the case where the determination result shows that the matching degree is higher than the predetermined matching degree, (iii) determines that correction is made using the motion amount estimated by the motion amount estimating unit 22.

It is noted that in the case where the image processing device 20 can obtain a shutter speed of the camera, the blur determining unit 232 may depend on the shutter speed to determine whether or not blur develops.

Described next is how to determine a picture with no distinctive object is captured therein as shown in FIG. 2B.

The feature point determining unit 231 determines whether or not the number of feature points extracted from either the first picture or the second picture is greater than a predetermined number. When the determination result shows that the number of feature points extracted from either the first picture or the second picture is greater than a predetermined number, the feature point determining unit 231 determines that correction is made based on a motion amount estimated by the motion amount estimating unit. Specifically, the feature point determining unit 231 calculates edge information from an input picture. In the case where the number of pixels each having edge strength greater than a predetermined value is smaller than a as threshold value, the feature point determining unit 231 determines that no distinctive object is captured.

It is noted that the feature point determining unit 231 may check whether or not there is a specific object captured in a picture, and determine whether or not a distinctive object is captured based on the presence or absence of the specific object. The feature point determining unit 231 may also divide a picture into multiple areas, check the variance of luminance values for each area, and determine the presence or absence of a distinctive object based on the variation of the values.

Figure 2C:
FIG. 2C exemplifies the case where a picture include a periodical pattern.
Figure 11:
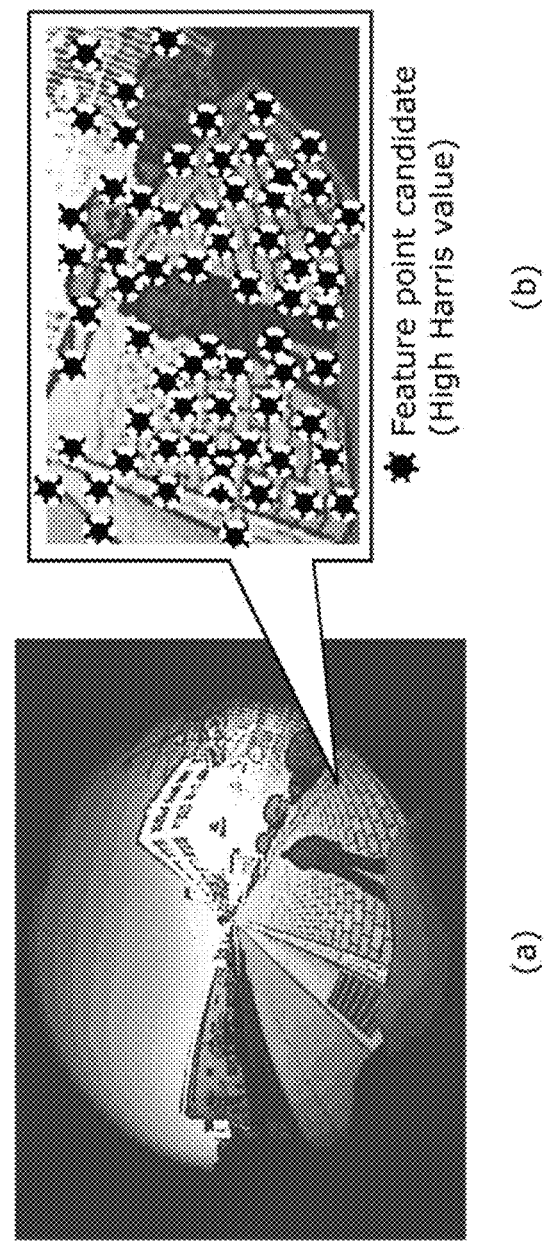
FIG. 11 shows feature points in a texture area.
Figure 12:
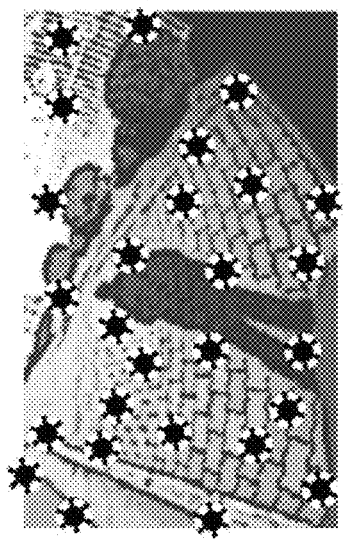
FIG. 12 shows how difficult it is to select common feature points between Picture t−1 and Picture t in the texture area.
Figure 12:
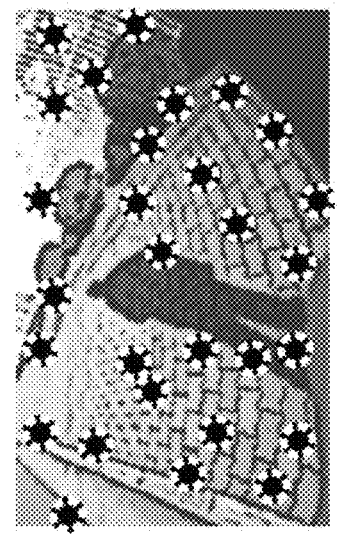
Figure 13:
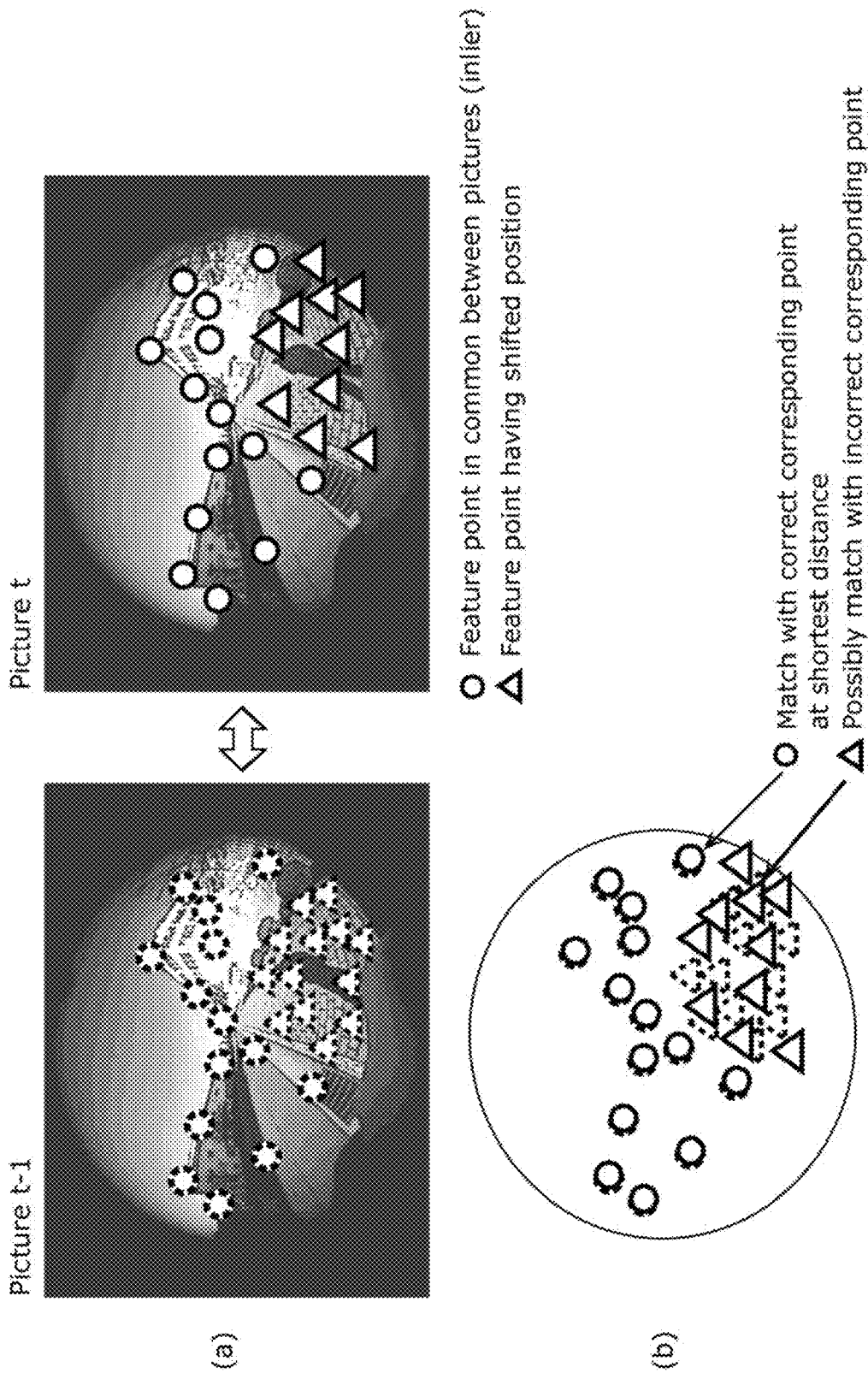
FIG. 13 shows how a matching degree of feature point distributions varies for each feature point when there is a texture area.
Figure 14:
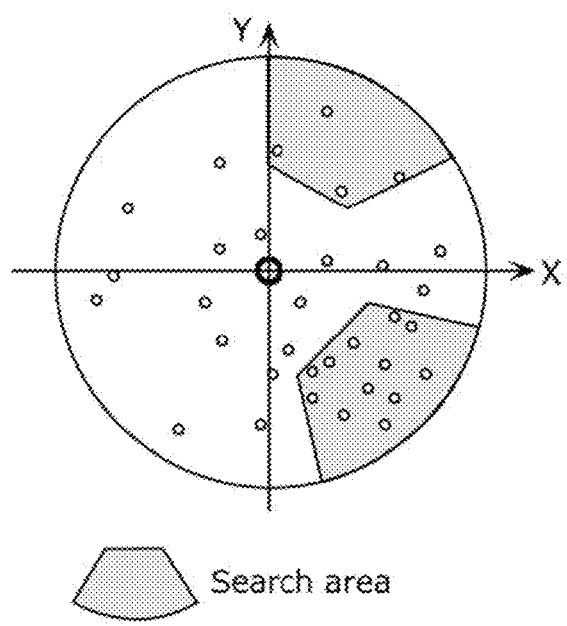
FIG. 14 shows a search area in a texture.

Described next is how to determine a picture including a periodical pattern (texture), such as tiles on pavement in FIG. 2C. FIG. 11 shows feature points in a texture area. FIG. 12 shows how difficult it is to select common feature points between Picture t−1 and Picture t in the texture area. FIG. 13 shows how a matching degree of feature point distributions varies for each feature point when there is a texture area. FIG. 14 shows a search area in a texture.

The texture determining unit 233 determines a picture including a texture, based on the frame for the feature point matching as blur is determined in the picture. Hereinafter described is why such a matching technique is adopted.

Regardless of the presence or absence of a periodical pattern (texture) in a picture, using all of the extracted feature points for matching by the feature point matching unit 223 would end up an extremely high calculation cost. Hence, the extracted feature points are narrowed down to some representative feature points for actual matching.

Figure 1A:
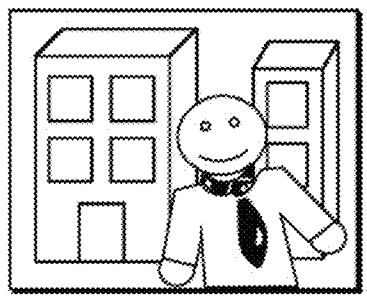
FIG. 1A illustrates a matching technique using feature points.
Figure 1A:
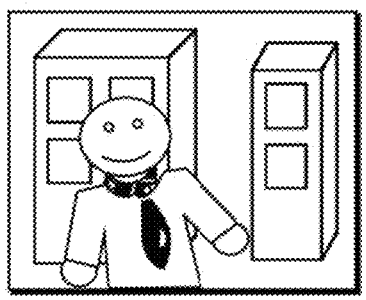
Figure 1B:
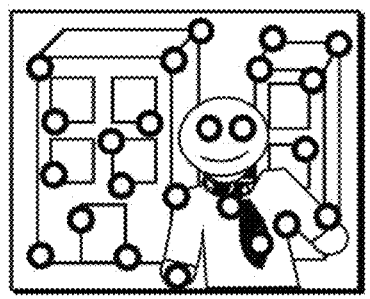
FIG. 1B illustrates the matching technique using feature points.
Figure 1B:
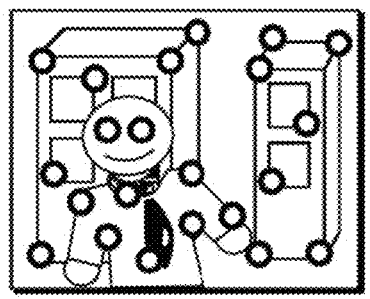
Figure 1C:
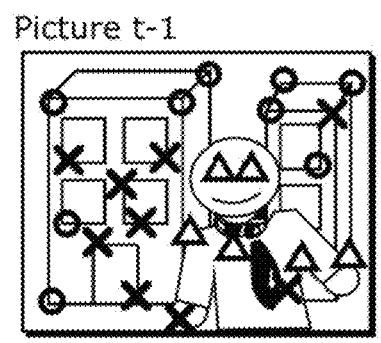
FIG. 1C illustrates the matching technique using feature points.
Figure 1C:
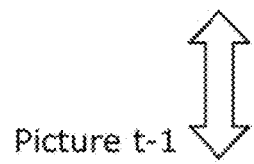
Figure 1C:
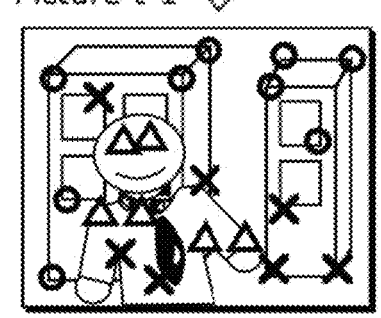
Figure 1D:
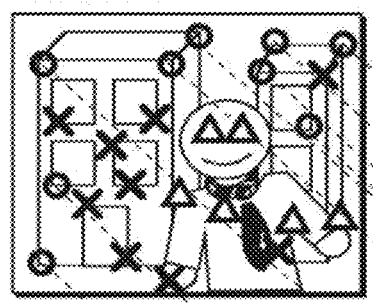
FIG. 1D illustrates the matching technique using feature points.
Figure 1D:
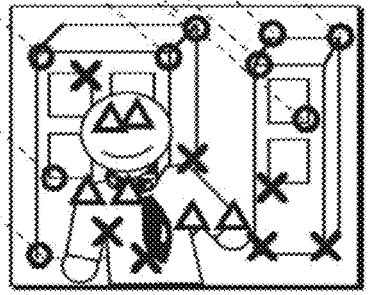

The narrowed feature points are the ones in O, Δ, X as shown in FIG. 1C. The camera shake amount (motion amount) can be more stably estimated between the pictures (frames) as there are more common feature points (inlier) found between pictures (frames) shown in O. In contrast, the estimation of the camera shake amount (motion amount) is more likely to be unsuccessful as there are more feature points shown in Δ and X. Thus, in order to stably estimate the camera shake amount (motion amount), it is essential to leave many feature points (inlier) shown in O when the number of the feature points is narrowed down.

The problem in narrowing down the number of the feature points is the characteristics of a texture area which periodically includes pixels having a similar high contrast with each other. For example, (a) in FIG. 11 shows that the texture area, such as tiles on pavement, includes periodically-arranged pixels having a similar high contrast with each other. Thus, many feature points based on the contrast information are extracted from the texture area, as shown in (b) in FIG. 11.

In the case where there is no texture area in a picture, the number of pixels having a high contrast is limited in the picture. Hence, the feature points shown in O (inlier), that are found in common between the frames, are likely to be left even though the number of the feature points is narrowed down. Consequently, the camera shake amount (motion amount) developed between pictures (frames) can be estimated by the feature point matching unit 223.

In contrast, in the case where a texture area is found in a picture, there are many pixels having a high contrast in the picture. Thus, as shown in FIG. 12, the feature points obtained from the texture area dominate the entire picture. Consequently, as shown in (a) in FIG. 13, the feature points to be selected are possibly the ones shown in Δ that are not found in common between pictures (frames). This is because there are no criteria for narrowing down the feature points since (i) the camera shake (motion amount) and details of the captured object are unknown and (ii) contrast values of the feature points, which are a great clue to identify the object, are similar with each other in the texture. Thus, no determination is made to narrow down to which feature points, and the feature points shown in Δ are selected in the end.

Hence, in the case where the feature point matching unit 223 performs matching based on the extracted feature points when a texture area is found in the picture, the camera shake amount between the pictures (frames) could be mis-estimated. The mis-estimation depends on how a matching degree of feature points is defined. A typical matching degree is the number of the feature points whose distance, between Picture t−1 after the shake amount (motion amount) is estimated and Picture t, is equal to a certain distance or shorter as shown, for example, in (b) in FIG. 8. Thus, when there are more feature points whose distance between Picture t−1 and Picture t is equal to or greater than a certain distance, the texture determining unit 233 may determine that the matching is successfully performed; that is, correction is made using the motion amount estimated by the motion amount estimating unit 22.

It is noted that FIG. 8 shows the case where no error factor, such as blur, is found between the pictures (frames). Actually, there is some sort of blur and there are errors to some extent. Thus, the shortest distance is set to satisfy the distance of the feature points between Picture t−1 and Picture t. The feature points to satisfy the set shortest distance are taken as the ones representing the camera shake amount (motion amount). As shown in (a) in FIG. 13, however, in the case where there are many feature points shown in Δ whose position changes between pictures, some of the feature points that are not actually representing the camera shake (motion amount) are taken as the feature points representing the camera shake (motion amount), depending on how the shortest distance is set as shown in (b) in FIG. 13. Thus, as described above, a texture area in the picture could be the cause of misestimating the camera shake amount (motion amount).

Because of such reasons, the texture determining unit 233 determines the presence or absence of the cause of the misestimation; namely a texture, to determine whether or not the motion amount estimated by the motion amount estimating unit 22 indicates the displacement amount (shake amount) of the second picture with respect to the first picture.

Specifically, the texture determining unit 233 takes advantage of the tendency (tiles in FIG. 2C) that a texture is likely to appear in a specific area of an image (picture) captured by a wide optical system, such as a fisheye optical system.

More specifically, the texture determining unit 233 can obtain a camera shake amount (motion amount) after the feature point matching unit 223 performs matching, which makes it possible to obtain a matching degree of distributions of feature points between the pictures (frames). When the obtained matching degree between the feature point distributions is high, considered are the cases where a correct shake amount is estimated and where the shake amount is misestimated (the case where there are many of Δ in FIG. 1C) due to a texture. Here, when the obtained matching degree between the feature point distributions is high, the feature point distributions (inlier distributions) having the high matching degree are divided in areas as shown in FIG. 14, and each area is checked whether or not the feature points are disproportionately found. In the case where there is an area having a significantly high feature point distribution (inlier distribution) when the matching degree is calculated for each area (in other words, feature points disproportionately found), the area is determined to be possibly affected by a texture.

When the area is determined to be possibly affected by the texture, the texture determining unit 233 obtains a contrast value of an adjacent area, and measures a matching degree of contrast in the adjacent area. In the case where the measured matching degree is high, there is a texture in the area (area where feature points are disproportionately found).

As described above, the texture determining unit 233 projects, to coordinates in three dimensions, the coordinates of the first feature points extracted from the first picture and the coordinates of the second feature points extracted from the second picture, further divides the first picture and the second picture into areas in the case where the matching degree, between the feature point distribution of the first feature points whose coordinates are three-dimensionally projected and the feature point distribution of the second feature points whose coordinates are three-dimensionally projected, is higher than a predetermined matching degree, checks, for each of the divided areas, the feature point distributions (inlier distributions), of the first feature points and of the second feature points, whose matching degree is higher than the predetermined matching degree, and determines that correction is not made using the motion amount estimated by the motion amount estimating unit 22 in the case where the feature point distributions (inlier distributions) are disproportionally found in one or more of the divided areas.

It is noted that in the case where the texture determining unit 233 determines that a texture can found, one of the following operations may be carried out: The shake amount (motion amount) may be estimated by another sensor, and the picture correcting unit 24 may correct the shake amount (motion amount); and the area including the texture may be masked to ignore the texture area, and then the feature point matching unit 223 may perform matching to estimate the camera shake amount (motion amount). Furthermore, the estimated may be used in time series and the texture areas may be kept masked, so that the effect of the texture is eliminated.

Hence, based on the extracted feature points, the determining unit 23 as structured above determines whether or not correction is made using the motion amount estimated by the motion amount estimating unit 22.

It is noted that the blur determining unit 232 and the texture determining unit 233 first transform, into coordinates in three dimensions, coordinates of the first feature points extracted from the first picture and of the second feature points extracted from the second picture, and then checks a matching degree between the feature point distribution of the first feature points and the feature point distribution of the second feature points. However, the matching degree may be checked with another technique. When no distortion by a optical system (lens) is corrected, such as a picture obtained not by a fisheye optical system, the coordinate transformation may be eliminated for carrying out the succeeding processing.

In the case where the determining unit 23 determines that the correction is made based on a motion amount, the picture correcting unit 24 corrects the displacement of the second picture with respect to the first picture using the motion amount so as to correct displacement between multiple pictures. Specifically, based on a correcting amount (motion amount) calculated by the feature point matching unit 223, the picture correcting unit 24 corrects the camera shake developed between the between the frames (pictures) of Picture t−1 and Picture t. The picture correcting unit 24 corrects the shake of Picture t with respect to Picture t−1, using parameters roll, pitch, yaw indicating the correction amount; namely the motion amount, to execute through the affine transform, for example.

Described next is a flow of processing on the above-structured image processing device 20.

Figure 15:
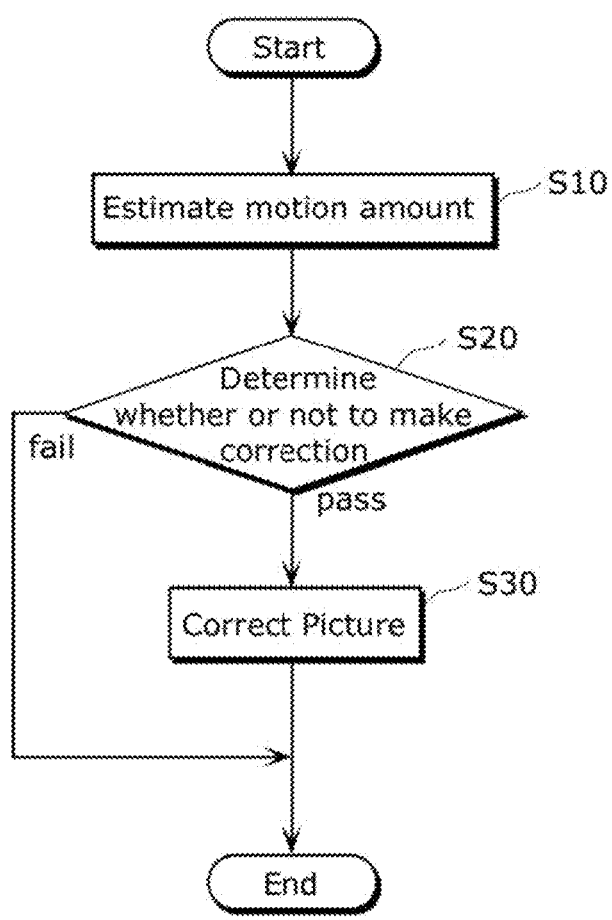
FIG. 15 depicts a flowchart showing a flow of processing on an image processing device 20 according to Embodiment 1 of the present invention.
Figure 16:
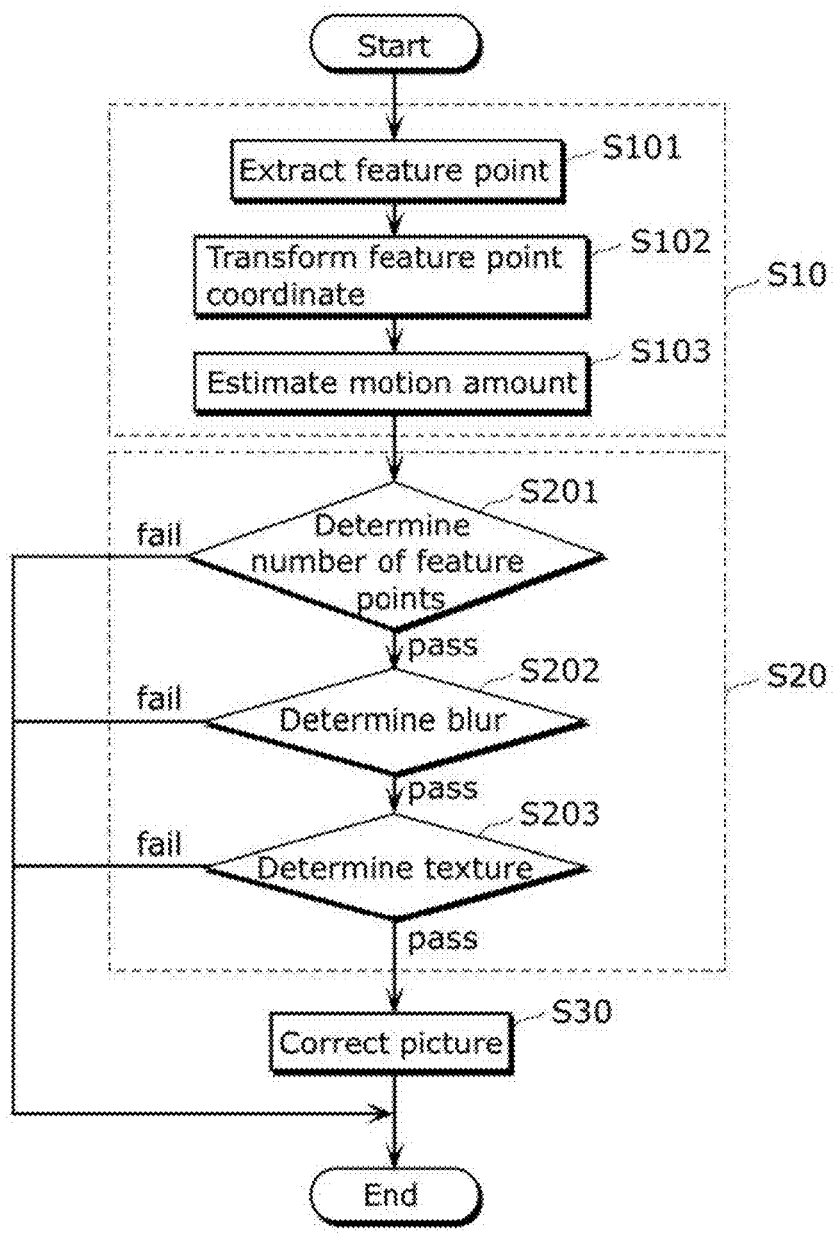
FIG. 16 depicts a flowchart showing a flow of processing on the image processing device 20 according to Embodiment 1 of the present invention.

FIGS. 15 and 16 depict flowcharts showing flows of processing on the image processing device 20 according to Embodiment 1 of the present invention. FIG. 16 details the processing in FIG. 15.

First, the image processing device 20 causes the picture obtaining unit 21 to obtain picture data to be processed. Specifically, the picture obtaining unit 21 reads picture data of each of Picture t and Picture t−1 both obtained from the imaging device 10.

Next, the motion amount estimating unit 22 estimates a motion amount indicating a displacement amount of the second picture with respect to the first picture, using the feature points extracted from each of the first picture and the second picture (S10). Here, the second picture is captured temporally after the first picture. Specifically, the feature point extracting unit 221 extracts first feature points from the first picture and second feature points from the second picture (S101). Then, the feature point coordinate transforming unit 222 transforms the coordinates of the first feature points in the first picture and the coordinates of the second feature points in the second picture into coordinates which conform to the projection technique of a fisheye optical system (S102). Here, the first and second feature points are extracted by the feature point extracting unit 221. As a result, the position of each of the feature points in the world coordinate is calculated. Next, the feature point matching unit 223 matches the first feature points of the first picture and the second feature points of the second picture with each other, and estimates the motion amount indicating the displacement amount of the second picture with respect to the first picture (S103). Here, the first and second feature points are extracted by the feature point extracting unit 221.

Then, based on the extracted feature points, the determining unit 23 determines, using the feature points, whether or not correction is made using the motion amount estimated by the motion amount estimating unit 22 (S20). Specifically, the determination is made on the number of the feature points. The feature point determining unit 231 determines whether or not the number of feature points extracted from either the first picture or the second picture is greater than a predetermined number (S201). In the case where the determination result shows that the number of the feature points extracted from either the first picture or the second picture is greater than the predetermined number (S201: Pass), the feature point determining unit 231 to S202. In the case where the determination result shows that the number of the feature points extracted from either the first picture or the second picture is not greater (in other words, smaller) than the predetermined number (S201: Fail), the feature point determining unit 231 determines that no correction is made using the motion amount estimated by the motion amount estimating unit 22, and finishes the processing of the image processing device 20. Then, determination is made on blur. The blur determining unit 232 projects, to coordinates in three dimensions, the coordinates of the first feature points extracted from the first picture and of the second feature points extracted from the second picture, and determines whether or not a matching degree between the feature point distribution of the first feature points and the feature point distribution of the second feature points is higher than a predetermined matching degree (S202). Here, the feature point distributions are found on the coordinates in three dimensions. In the case where the determination result shows that the matching degree is higher than the predetermined matching degree, the blur determining unit 232 determines that correction is made using the motion amount estimated by the motion amount estimating unit 22 (S201: Pass), and proceeds to S203. In the case where the matching degree is not higher (in other words, lower) than the predetermined matching degree (S202: Fail), the blur determining unit 232 determines that no correction is made using the motion amount estimated by the motion amount estimating unit 22, and finishes the processing of the image processing device 20. Then, determination is made on a texture. The texture determining unit 233 projects, to the coordinates in three dimensions, the coordinates of the first feature points extracted from the first picture and of the second feature points extracted from the second picture, further divides the first picture and the second picture into areas in the case where the matching degree, between the feature point distribution of the first feature points whose coordinates are three-dimensionally projected and the feature point distribution of the second feature points whose coordinates are three-dimensionally projected, is higher than the predetermined matching degree, and checks, for each of the divided areas, the feature point distributions (inlier distributions), of the first feature points and the second feature points, whose matching degree is higher than the predetermined matching degree (S203). In the case where the feature point distributions (inlier distributions) are not disproportionally found in one or more of the divided areas (S203: Pass), the texture determining unit 233 determines that correction is made using the motion amount estimated by the motion amount estimating unit 22, and proceeds to S30. In the case where the feature point distributions (inlier distributions) are disproportionally found in one or more of the divided areas (S203: Fail), the texture determining unit 233 determines that correction is not made using the motion amount estimated by the motion amount estimating unit 22, and finishes the processing of the image processing device 20.

Next, in the case where the determining unit 23 determines that the correction is made using the motion amount, the picture correcting unit 24 corrects the displacement of the second picture with respect to the first picture using the motion amount so as to correct displacement between multiple pictures (S30). In other words, the picture correcting unit 24 corrects shake of an image using the motion amount (shake amount) estimated by the motion amount estimating unit 22 once all the determinations are passed in the determining unit 23.

That is how the image processing device 20 carries out processing.

In estimating through image processing a shake amount of an image captured by, for example, a fisheye optical system, the image processing device 20 successfully prevents the deterioration of the image quality by making correction based on a shake amount which is mis-estimated out of a picture whose shake amount cannot be estimated by image processing. In other words, the image processing device 20 corrects in high accuracy the shake amount between the pictures obtained by temporally-continued capturing or avoids making correction with a wrong value so that the finished image quality is successfully improved, even though some of the pictures cannot have the shake amounts estimated by image processing.

Embodiment 1 can implement an image processing device and an image processing method which are capable of correcting in high accuracy a shake amount between pictures obtained by temporally-continued capturing, even though some of the pictures cannot have the shake amounts estimated by image processing.

It is noted that the image processing device according to Embodiment 1 is highly effective for an ultrawide image such as a fisheye image; however, the application of the device shall not be limited to such an image. The device can be used for capturing an image having a regular angle of view, which is equal to 70 degrees or less.

In the embodiment, the image processing device 20 includes the image processing unit 20a and the picture obtaining unit 21; however, the structure of the image processing device 20 shall not be limited to this. The image processing device 20 may include the image processing unit 20a as the minimum structure. The image processing device 20 may include at least the image processing unit 20a. This structure successfully corrects in high accuracy a shake amount between pictures obtained by temporally-continued capturing, even though some of the pictures cannot have the shake amount estimated by image processing.

Embodiment 2

Embodiment 1 involves calculating a shake amount (motion amount) through the image processing by the motion amount estimating unit 22; however, the obtainment of the shake amount shall not be limited by the calculation. A sensor may also be used to estimate the shake amount (motion amount). Described hereinafter are an image processing device and an image processing method according to Embodiment 2, with reference to the drawings.

Figure 17:
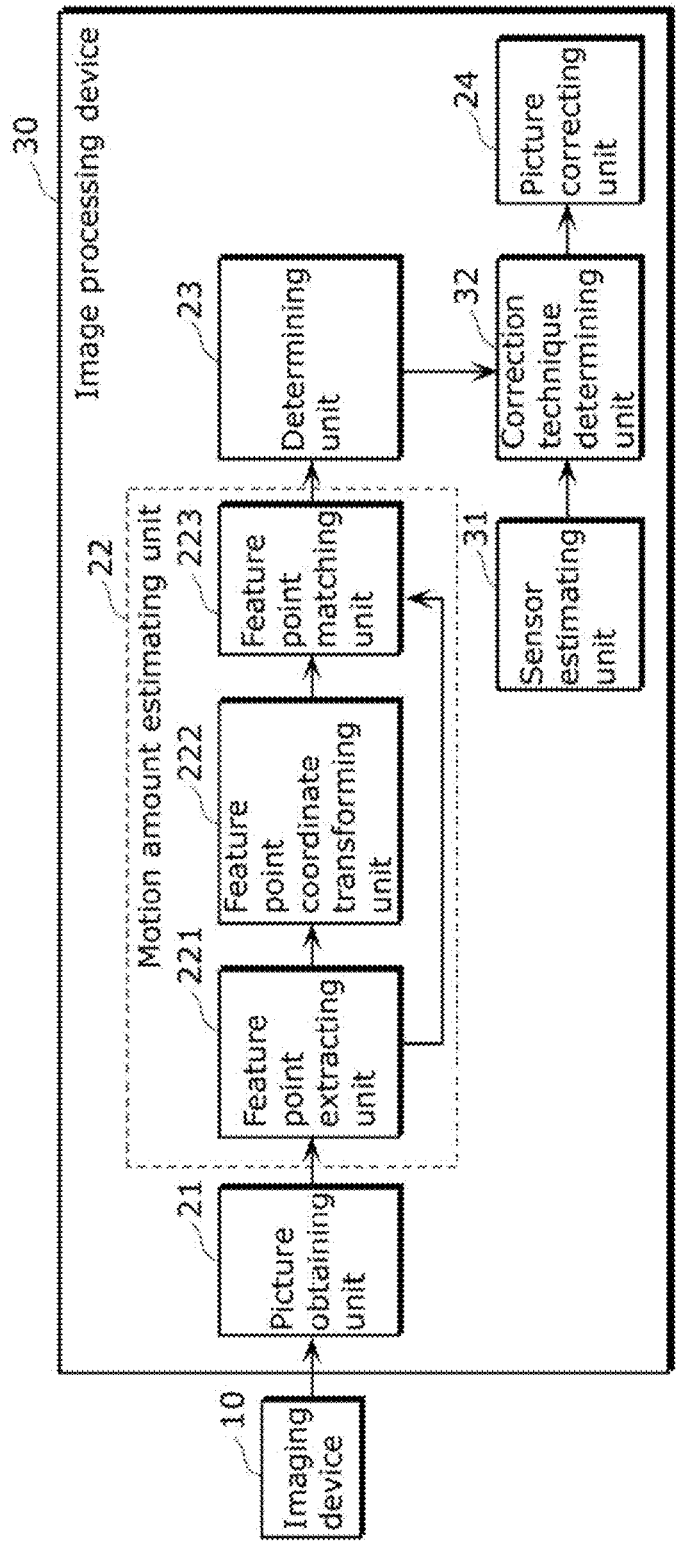
FIG. 17 depicts a block diagram showing an overall structure of an image processing device according to Embodiment 2 of the present invention.

FIG. 17 depicts a block diagram showing an overall structure of an image processing device according to Embodiment 2 of the present invention. Similar constitutional elements between FIGS. 3 and 4 share the same numerical references, and the details thereof shall be omitted. Detailed here are different constitutional elements from the ones in FIGS. 3 and 4.

The overall structure shown in FIG. 17 and detailed in Embodiment 2 differs from the overall structure shown in FIG. 3 and detailed in Embodiment 1 in that the structure in Embodiment 2 further includes a sensor estimating unit 31 and a correcting technique determining unit 32.

The sensor estimating unit 31 measures either an angle of rotation about an axis of the optical system used for capturing or an angle of rotation about at least one of two axes perpendicular to each other with respect to the axis of the optical system, and estimates the measured angle of rotation as a motion amount indicating a displacement amount of the second picture with respect to the first picture. Specifically, the sensor estimating unit 31 uses a sensor to estimate a shake amount (motion amount) of a camera between pictures (frames). Here, the sensor estimating unit 31 includes at least one of an angular acceleration sensor, an angular velocity sensor, an acceleration sensor, a gyroscope, and a direction sensor. It is noted that one of or a combination of the above sensors measures a shake amount (motion amount) of a camera developed between pictures (frames). Moreover, the sensor estimating unit 31 may estimate the shake amount (motion amount) of a picture (frame) by processing the shake amount (motion amount) measured by the sensor in time series.

In the case where the determining unit 23 determines that no correction is made using the motion amount estimated by the motion amount estimating unit 22, the correcting technique determining unit 32 determines whether or not correction is made using the motion amount estimated by the sensor estimating unit 31. Specifically, in the case where the determining unit 23 determines that the result of the image processing is not applicable, the correcting technique determining unit 32 determines whether or not the shake amount (motion amount) estimated by the sensor estimating unit 31 between the pictures (frames) is applicable. Specifically, using a sensor such as an acceleration sensor and a gyroscope, the correcting technique determining unit 32 observes the motion found between the pictures (frames) or among the pictures (frames) in order to determine whether or not to use the shake amount (motion amount) estimated by the sensor estimating unit 31.

It is noted that in observing the motion found between the pictures (frames) or among the pictures (frames), the correcting technique determining unit 32 can determine that the camera shake amount (motion amount) is larger as a value of the sensor varies greater among, for example, the pictures (frames). Thus, when the value of the sensor varies greatly, the correcting technique determining unit 32 may determine not to use the shake amount (motion amount) estimated by the sensor estimating unit 31 for correction, since the use of such a shake amount deteriorates accuracy of the sensor. In contrast, when a motion of the sensor is stable, the correcting technique determining unit 32 may find that the camera is in a motionless state, and determine to use the shake amount (motion amount) estimated by the sensor estimating unit 31 for correction.

Described next is a flow of processing on the above-structured image processing device 30.

Figure 18:
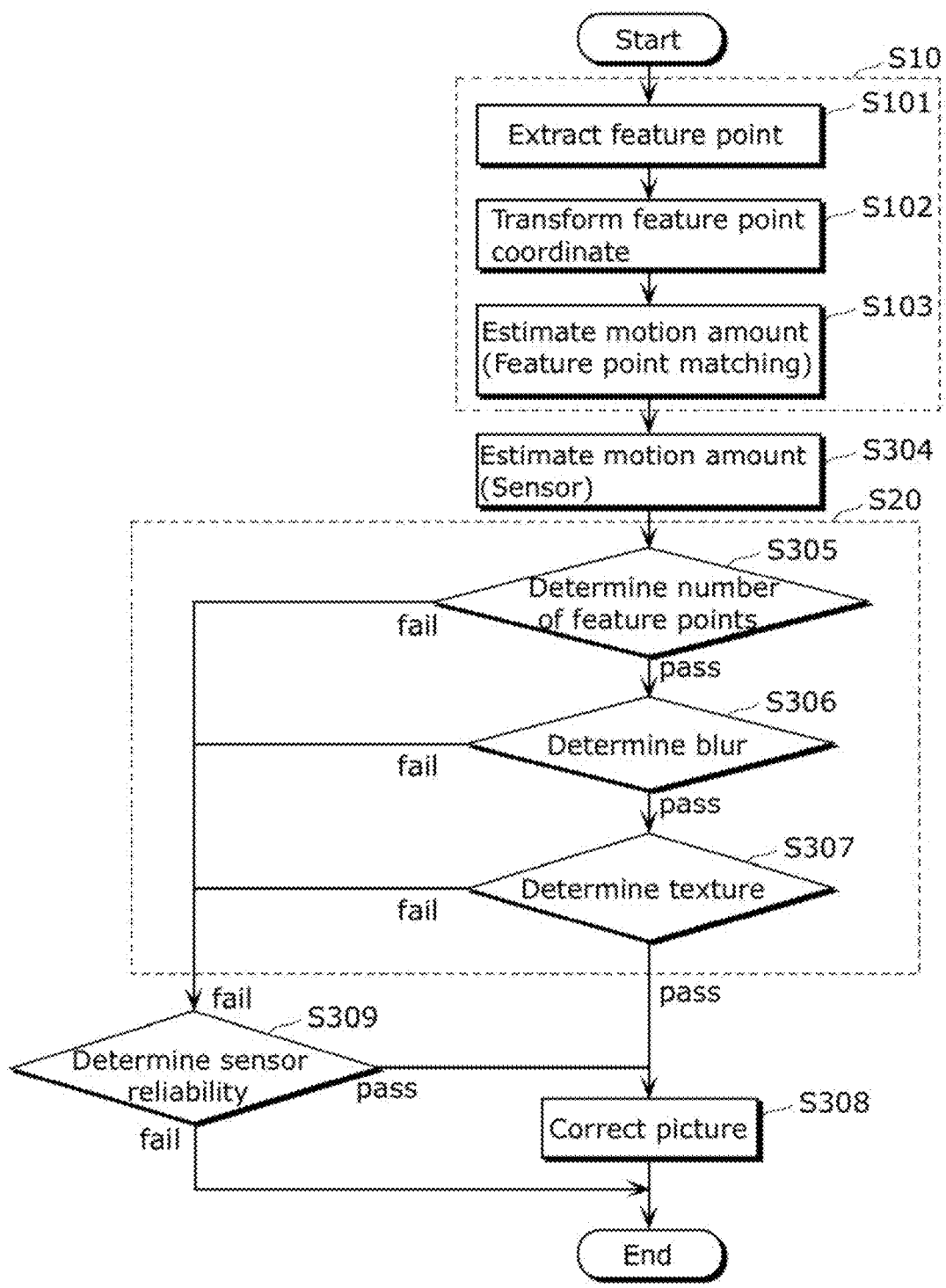
FIG. 18 depicts a flowchart showing a flow of processing on an image processing device 30 according to Embodiment 2 of the present invention.

FIG. 18 depicts a flowchart showing a flow of processing on an image processing device 30 according to Embodiment 2 of the present invention. It is noted that similar constitutional elements between FIG. 18 and FIG. 16 share the same numerical references, and the details thereof shall be omitted.

In S10, the motion amount estimating unit 22 estimates a motion amount indicating a displacement amount of the second picture with respect to the first picture, using the feature points extracted from each of the first picture and the second picture. Here, the second picture is captured temporally after the first picture.

Next, the sensor estimating unit 31 measures either an angle of rotation about an axis of the optical system used for capturing or an angle of rotation about at least one of two axes perpendicular to each other with respect to the axis of the optical system, and estimates the measured angle of rotation as a motion amount of the second picture with respect to the first picture (S15).

Then, based on the extracted feature points, the determining unit 23 determines whether or not correction is made using the motion amount estimated by the motion amount estimating unit 22 (S20). In S20, in the case where the determination result shows that no correction is made using the motion amount estimated by the motion amount estimating unit 22 (S20: Fail), the determining unit 23 does not finish the processing of the image processing device 30, and proceeds to sensor reliability determination in S25.

In S25, when the determining unit 23 determines that no correction is made using the motion amount estimated by the motion amount estimating unit 22, the correcting technique determining unit 32 determines whether or not the correction is made using the motion amount estimated by the sensor estimating unit 31. In the case where the determination result shows that the correction is made based on the shake amount (motion amount) estimated by the sensor estimating unit 31 (S25: Pass), the correcting technique determining unit 32 proceeds to S30. In contrast, in the case where the determination result shows that no correction is made based on the shake amount (motion amount) estimated by the sensor estimating unit 31 (S25: Fail), the correcting technique determining unit 32 finishes the processing of the image processing device 30.

Next, when the determining unit 23 determines that the correction is made using the motion amount estimated by the motion amount estimating unit 22 (S20: Pass), the picture correcting unit 24 corrects the displacement of the second picture with respect to the first picture using the motion amount estimated by the motion amount estimating unit 22, so that displacement between multiple pictures is corrected (S30). In contrast, when the correcting technique determining unit 32 determines that the correction is made using the motion amount estimated by the sensor estimating unit 31 (S25: Pass), the picture correcting unit 24 corrects the displacement of the second picture with respect to the first picture using the motion amount estimated by the sensor estimating unit 31, so that displacement between multiple pictures is corrected (S30).

That is how the image processing device 30 carries out processing.

Embodiment 2 can implement an image processing device and an image processing method which are capable of correcting in high accuracy a shake amount between pictures obtained by temporally-continued capturing, even though some of the pictures cannot have the shake amounts estimated by image processing. Specifically, the image processing device and the image processing method in Embodiment 2 determine a scene including a picture which is unsuitable to image processing, using picture information to be obtained through feature-point-based matching processing, and selectively adopts or disuses a shake amount estimated through image processing or by a sensor, depending on the determined scene. Such operations make it possible to correct in high accuracy shake of a captured image.

The present invention successfully implements image processing devices and image processing methods which are capable of correcting in high accuracy a shake amount between pictures obtained by temporally-continued capturing.

For the image processing device of the present invention, it does not matter when a picture to be corrected is captured. Furthermore, the image processing device is included in a digital still camera and a digital camcorder and corrects a captured picture on the spot; however, the feature of the image processing device shall not be limited to this. For example, the image processing device may be separately prepared in the form of an application in a personal computer. The image processing device may receive a captured picture via a cable directly connecting the computer with a recording device, such as a camera. The image processing device may also read picture data via a recording medium such as a secure digital (SD) card and a network.

Although only some exemplary embodiments of this invention have been described for the image processing device, the image processing method, and the program in detail above, the present invention shall not be limited to the embodiments. The present invention includes the following cases:

(1) Each of the aforementioned devices is, specifically, a computer system including a microprocessor, a ROM, a RAM, a hard disk unit, a display unit, a keyboard, a mouse, and so on. The RAM or hard disk unit stores a computer program. The devices achieve their functions through the microprocessor's operation according to the computer program. Here, the computer program is configured by combining instruction codes indicating instructions for the computer in order to achieve predetermined functions.

(2) Part or all of the constituent elements constituting the respective device may be configured from a single System-LSI (Large-Scale Integration). The System-LSI is a super-multi-function LSI manufactured by integrating constituent units on one chip. Specifically, the System-LSI is a computer system configured by including a microprocessor, a ROM, a RAM, or by means of a similar device. The RAM stores a computer program. The System-LSI performs its functions through the microprocessor's operation according to the computer program.

(3) Part or all of the constituent elements constituting the each of the apparatuses may be configured as an IC card which can be attached and detached from each apparatus or as a stand-alone module. The IC card or the module is a computer system configured from a microprocessor, a ROM, and a RAM. The IC card or the module may also be included in the aforementioned super-multi-function LSI. The IC card or the module achieves its function through the microprocessor's operation according to the computer program. The IC card or the module may also be implemented to be tamper-resistant.

(4) The present invention may be a method for the above functions. The present invention, may be a computer program for implementing the above method, using a computer, and may also be a digital signal including the computer program.

Furthermore, the present invention may also be implemented by storing the computer program or the digital signal in a computer readable recording medium such as a flexible disc, a hard disk, a CD-ROM, an MO, a DVD, a DVD-ROM, a DVD-RAM, a BD (Blu-ray Disc), and semiconductor memory. The present invention may also include the digital signal recorded in these recording media.

Furthermore, the present invention may also be implemented by the transmission of the aforementioned computer program or digital signal via a telecommunication line, a wireless or wired communication line, a network represented by the Internet, and data broadcast.

The present invention may also be a computer system including a microprocessor and memory, in which the memory stores the aforementioned computer program and the microprocessor operates according to the computer program.

Furthermore, by transferring the program or the digital signal by recording onto the aforementioned recording media, or by transferring the program or digital signal via the aforementioned network, execution using another independent computer system is also made possible.

(5) Accordingly, any given combination of the aforementioned embodiments and the modifications of the embodiments is included within the scope of this invention.

INDUSTRIAL APPLICABILITY

An image processing device according to an implementation of the present invention is useful for correcting in high accuracy shake of an image captured by a wide optical system, such as a fisheye optical system, by determining a scene including a picture which is unsuitable to image processing, using picture information, and selectively adopts a sensor or image processing, depending on the scene. The image processing device of the present invention may be used as an image correction processing device for a digital still camera, a camcorder, and a wearable camera, and for software in a personal computer.

REFERENCE SIGNS LIST

10 Imaging device
20 and 30 Image processing device
20a Image processing unit
21 Picture obtaining unit
22 Motion amount estimating unit
23 Determining unit
24 Picture correcting unit
31 Sensor estimating unit
32 Correcting technique determining unit
221 Feature point extracting unit
222 Feature point coordinate transforming unit
223 Feature point matching unit
224 Memory
231 Feature point determining unit
232 Blur determining unit
233 Texture determining unit

The invention claimed is:

1. An image processing device which corrects displacement between pictures obtained by temporally-continuous capturing, the image processing device comprising:
a motion amount estimating unit configured to estimate, using feature points extracted from each of a first picture and a second picture, a motion amount indicating an amount of displacement of the second picture with respect to the first picture, the second picture being captured temporally after the first picture;

a determining unit configured to determine, using the feature points, whether or not correction is made using the motion amount estimated by the motion amount estimating unit; and a picture correcting unit configured to correct the displacement of the second picture with respect to the first picture using the motion amount so as to correct the displacement between the pictures, in the case where the determining unit determines that the correction is made using the motion amount, wherein the pictures are captured by a fisheye optical system, the motion amount estimating unit includes:

a feature point extracting unit configured to extract first feature points from the first picture and second feature points from the second picture;

a feature point matching unit configured to match the first feature points and the second feature points with each other to estimate the motion amount indicating the displacement amount of the second picture with respect to the first picture, the first feature points and the second feature points being extracted by the feature point extracting unit; and a feature point coordinate transforming unit configured to (i) transform coordinates of the first feature points into three-dimensional coordinates of the first feature points which are three-dimensionally projected in conformity to a projection technique of the fisheye optical system and (ii) transform coordinates of the second feature points into three-dimensional coordinates of the second feature points which are three-dimensionally projected in conformity to the projection technique of the fisheye optical system, the first feature points and the second feature points being extracted by the feature point extracting unit, and the feature point matching unit is configured to match the three-dimensional coordinates of the first feature points and the three-dimensional coordinates of the second feature points to estimate the motion amount indicating the displacement amount of the second picture with respect to the first picture.

2. The image processing device according to claim 1, wherein in the case where the determining unit determines using the feature points that the motion amount estimated by the motion amount estimating unit indicates the displacement amount of the second picture with respect to the first picture, the determining unit is configured to determine that the correction is made using the motion amount estimated by the motion amount estimating unit.

3. The image processing device according to claim 1, wherein in the case where the determining unit determines that the number of the feature points extracted from one of the first picture and the second picture is greater than a predetermined number, the determining unit is configured to determine that the correction is made using the motion amount estimated by the motion amount estimating unit.

4. The image processing device according to claim 1, wherein the determining unit is configured to (i) determine whether or not a matching degree between a feature point distribution of the first feature points and a feature point distribution of the second feature points is higher than a predetermined matching degree, and, in the case where a result of the determination shows that the matching degree is higher than the predetermined matching degree, (ii) determine that the correction is made using the motion amount estimated by the motion amount estimating unit, the first feature points (i) being extracted from the first picture and (ii) having the three-dimensional coordinates of the first feature points which are projected in three dimensions so that the distributed first feature points are found on the three-dimensional coordinates of the first feature points, and second first feature points (i) being extracted from the second picture and (ii) having the three-dimensional coordinates of the second feature points which are projected in three dimensions so that the distributed second feature points are found on the three-dimensional coordinates of the second feature points.

5. The image processing device according to claim 1, wherein in the case where a matching degree between a feature point distribution of the first feature points extracted from the first picture and a feature point distribution of the second feature points extracted from the second picture is higher than a predetermined matching degree, the determining unit is further configured to (i) divide the first picture and the second picture into areas, (ii) check, for each of the divided areas, the feature point distribution of the first feature points and the feature point distribution of the second feature points having the matching degree higher than the predetermined matching degree, and in the case where the feature point distributions are disproportionally found in one or more of the divided areas, (iii) determine that the correction is not made using the motion amount estimated by the motion amount estimating unit, the first feature points (i) being extracted from the first picture and (ii) having the three-dimensional coordinates of the first feature points which are projected in three dimensions so that the distributed first feature points are found on the three-dimensional coordinates of the first feature points, and second first feature points (i) being extracted from the second picture and (ii) having the three-dimensional coordinates of the second feature points which are projected in three dimensions so that the distributed second feature points are found on the three-dimensional coordinates of the second feature points.

6. The image processing device according to claim 1, further comprising a sensor estimating unit configured to measure an angle of rotation about an axis of an optical system used for capturing or an angle of rotation about at least one of two axes perpendicular to each other with respect to the axis of the optical system, and estimate the measured angle of rotation as a measured angle of rotation motion amount of the second picture with respect to the first picture.

7. The image processing device according to claim 6, wherein the sensor estimating unit includes at least one of an angular acceleration sensor, an angular velocity sensor, an acceleration sensor, and a direction sensor.

8. The image processing device according to claim 6, further comprising a correcting technique determining unit configured to determine whether or not the correction is made using the motion amount estimated by the sensor estimating unit, in the case where the determining unit determines that no correction is made using the motion amount estimated by the motion amount estimating unit.

9. An image processing method for correcting displacement between pictures obtained by temporally-continuous capturing, the image processing method comprising:

estimating a motion amount indicating a displacement amount of a second picture with respect to a first picture using feature points extracted from each of the first picture and the second picture, the second picture being captured temporally after the first picture;

determining, using the feature points, whether or not correction is made using the motion amount estimated by the motion amount estimating unit; and correcting the displacement of the second picture with respect to the first picture using the motion amount so as to correct the displacement between the pictures, in the case where the determining involves determining that the correction is made using the motion amount, wherein the pictures are captured by a fisheye optical system, the estimating includes:
 extracting first feature points from the first picture and second feature points from the second picture;
 matching the first feature points and the second feature points to estimate the motion amount indicating the displacement amount of the second picture with respect to the first picture, the first feature points and the second feature points being extracted in the extracting; and
 (i) transforming coordinates of the first feature points into three-dimensional coordinates of the first feature points which conform to a projection technique of the fisheye optical system and (ii) transforming coordinates of the second feature points into three-dimensional coordinates of the second feature points which conform to the projection technique of the fisheye optical system,
the first feature points and the second feature points being extracted in the extracting, and
the matching involves matching the three-dimensional coordinates of the first feature points and the three-dimensional coordinates of the second feature points to estimate the motion amount indicating the displacement amount of the second picture with respect to the first picture.

10. A non-transitory computer-readable recording medium for use in a computer, the recording medium having a computer program recorded thereon, the computer program causing the computer to correct displacement between pictures obtained by temporally-continued capturing, and the program causing the computer to execute:

estimating a motion amount indicating a displacement amount of a second picture with respect to a first picture using feature points extracted from each of the first picture and the second picture, the second picture being captured temporally after the first picture;

determining, using the feature points, whether or not correction is made using the motion amount estimated by the motion amount estimating unit; and correcting the displacement of the second picture with respect to the first picture using the motion amount so as to correct the displacement between the pictures, in the case where the determining involves determining that the correction is made using the motion amount, wherein the pictures are captured by a fisheye optical system, the estimating includes:
 extracting first feature points from the first picture and second feature points from the second picture;
 matching the first feature points and the second feature points to estimate the motion amount indicating the displacement amount of the second picture with respect to the first picture, the first feature points and the second feature points being extracted in the extracting; and
 (i) transforming coordinates of the first feature points into three-dimensional coordinates of the first feature points which conform to a projection technique of the fisheye optical system and (ii) transforming coordinates of the second feature points into three-dimensional coordinates of the second feature points which conform to the projection technique of the fisheye optical system,
the first feature points and the second feature points being extracted in the extracting, and
the matching involves matching the three-dimensional coordinates of the first feature points and the three-dimensional coordinates of the second feature points to estimate the motion amount indicating the displacement amount of the second picture with respect to the first picture.

11. An integrated circuit for correcting displacement between pictures obtained by temporally-continuous capturing, the integrated circuit comprising:

a motion amount estimating unit configured to estimate, using feature points extracted from each of a first picture and a second picture, a motion amount indicating an amount of displacement of the second picture with respect to the first picture, the second picture being captured temporally after the first picture;

a determining unit configured to determine, using the feature points, whether or not correction is made using the motion amount estimated by the motion amount estimating unit; and a picture correcting unit configured to correct the displacement of the second picture with respect to the first picture using the motion amount so as to correct the displacement between the pictures, in the case where the determining unit determines that the correction is made using the motion amount, wherein the pictures are captured by a fisheye optical system, the motion amount estimating unit includes:
 a feature point extracting unit configured to extract first feature points from the first picture and second feature points from the second picture;
 a feature point matching unit configured to match the first feature points and the second feature points to estimate the motion amount indicating the displacement amount of the second picture with respect to the first picture, the first feature points and the second feature points being extracted by the feature point extracting unit; and
 a feature point coordinate transforming unit configured to (i) transform coordinates of the first feature points into three-dimensional coordinates which conform to a projection technique of the fisheye optical system and (ii) transform coordinates of the second feature points into three-dimensional coordinates of the second feature points which conform to the projection technique of the fisheye optical system, the first feature points and the second feature points being extracted by the feature point extracting unit, and
the feature point matching unit is configured to match the three-dimensional coordinates of the first feature points and the three-dimensional coordinates of the second feature points to estimate the motion amount indicating the displacement amount of the second picture with respect to the first picture.

* * * * *